INVENTOR
Auguste Van LAETHEM

ATTORNEY

INVENTOR
Auguste Van LAETHEM

ATTORNEY

United States Patent Office 3,529,391
Patented Sept. 22, 1970

3,529,391
GRATED OPENING
Auguste Van Laethem, Ruisbroek, Belgium, assignor to Ateliers de Constructions Electriques de Charleroi (ACEC) Societe Anonyme, Charleroi, Belgium
Filed Oct. 11, 1968, Ser. No. 766,678
Claims priority, application Belgium, Oct. 11, 1967, 704,931
Int. Cl. E04c 2/42; F16s 3/00
U.S. Cl. 52—656                                    4 Claims

ABSTRACT OF THE DISCLOSURE

A grated enclosure having a front wall formed with a four-sided opening, two opposite sides of which are defined by sharp edges while the remaining two sides are each provided with an inclined lip projecting in the same direction to define terminal bar-applying walls. The grate to be mounted in the said opening is formed of interconnected spaced bars including a pair of terminal bars spaced so as to be applied against the terminal bar-applying walls. These terminal bars are also of a length greater than the distance between the sharp edges so as to be made to lie beneath the said sharp edges to hold the grate in position.

---

The present invention relates to enclosures having grated openings.

An object of the present invention lies in the provision of enclosures, such as those for heating devices, comprising grated openings and grates adapted for these enclosures. The purpose of the invention is to facilitate the mounting of the grates and to improve the appearance of the enclosures by practically eliminating any auxiliary securing means.

Enclosures provided with grated openings according to the invention are characterized in that two opposite sides of the openings are bordered by inwardly inclined surfaces, that the other two opposite sides are bordered by sharp edges, that the ends of the grates corresponding with the first mentioned opposite sides are wedged against the inclined surfaces and that the ends of the grates coinciding with the remaining two sides are held by the sharp edges. The invention also relates to grates adapted to these enclosures characterized in that they are formed by a series of bars of which the two terminal bars are formed to extend along side the inclined surfaces bordering the grated opening, these bars being connected together by cross bars.

Figures 1, 2:
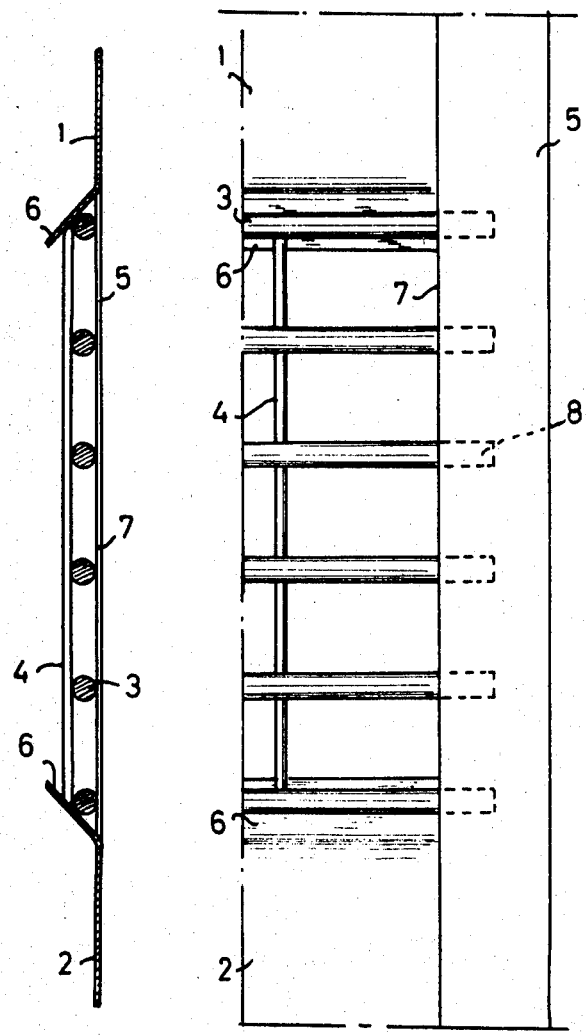
Figure 3:
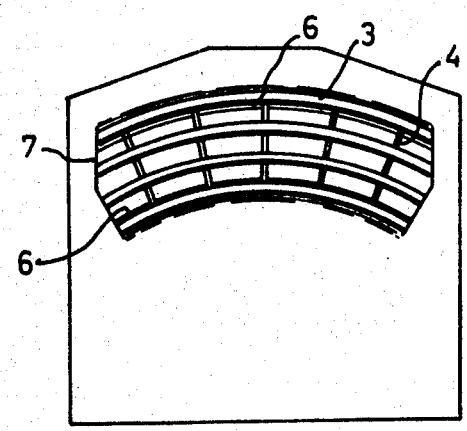
Figure 4:
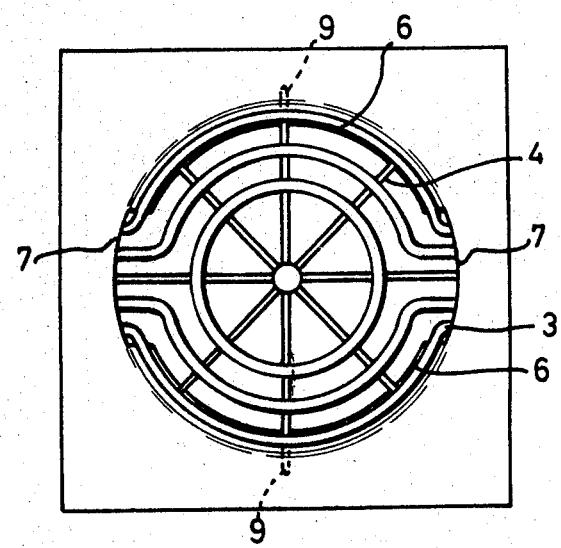

The invention will be explained hereinbelow in relation to a few embodiments having reference to the appended drawings wherein FIGS. 1 and 2 are a cross-sectional view and a partial front view, respectively, of an enclosure with grated opening. FIGS. 3 and 4 are front views of further embodiments.

In FIGS. 1 and 2, sufficiently wide edges of two sheet metal plates 1 and 2 of the front wall of an enclosure are bent inwardly to serve as a support for a grate formed of longitudinals bars 3 and cross bars 4. The two plates 1 and 2 are secured to lateral strips 5 having sharp edges so that an opening is defined in which the longer sides are formed by the inwardly inclined lips 6 whereas the two shorter sides are bordered by the sharp edges 7 of the lateral strips 5. The grate is constituted by a series of equidistantly spaced parallel longitudinal bars 3 and equidistantly spaced parallel cross bars 4 having a length equal to the distance between the two terminal bars 3. The two terminal bars 3 coinciding with the two longer sides are wedged against the inclined lips 6 whereas the ends 8 of the bars 3 coinciding with the shorter side of the grate are slid beneath the sharp edges of the lateral strips 5.

FIGS. 3 and 4 illustrate grated enclosures having non-rectangular openings cut out through a sheet metal plate. The inclined lips 6 that alternate with the sharp edges 7 may be obtained by snarling by means of a stamping press. In order to avoid difficulties of alignment, extensions 9 of one of the cross bars 4 may be inserted in two small holes provided in the two inclined lips 6 bordering the opening.

I claim:
1. A grated opening comprising:
   (a) a front wall lying in a generally flat plane and formed with an opening having four grate-holding sides; said front wall having an outer and inner face;
   (b) two opposite grate-holding sides of said opening being defined solely by sharp edges lying in said plane;
   (c) the other two grate-holding sides of said opening each having an inclined flat lip formed integral with said front wall and projecting away from said plane toward one another to define terminal bar-applying walls;
   (d) a grate mounted across said opening;
   (e) said grate having spaced generally parallel bars including a pair of terminal bars following the general contour of said terminal bar-applying walls;
   (f) said terminal bars being spaced from one another a distance such that said terminal bars are flatly applied intermediate the ends thereof along substantially the full length against the outwardly facing side of said terminal bar-applying walls;
   (g) said grate further having bars interconnecting all of said spaced bars together;
   (h) said terminal bars having a length greater than the distance between said sharp edges with the ends thereof being applied against said inner face of said front wall along said sharp edges, whereby said grate is held in position across said opening solely by having the terminal bars applied simultaneously against the inner face of said front wall and the outwardly facing side of said terminal bar-applying walls.

2. A grated opening as claimed in claim 1, wherein said grate is formed of horizontal bars, including said terminal bars, and transverse vertical bars secured to said horizontal bars.

3. A grated opening as claimed in claim 1, wherein said other two sides are curved in the same direction and said grate is formed of likewise curved longitudinal parallel bars, including said terminal bars, and transverse bars securing said longitudinal bars together.

4. A grated opening as claimed in claim 5, wherein said opening is circular, said other two sides are defined by portions of said circular opening and said sharp edges are formed by the remaining portions of said openings; said terminal bars are circular along said terminal bar-applying walls and straight thereafter to be inserted behind said sharp edges.

References Cited

UNITED STATES PATENTS

| | | | |
|---|---|---|---|
| 739,430 | 9/1903 | Lunken | 49—56 |
| 937,893 | 10/1909 | Tuttle | 49—56 |
| 1,438,982 | 12/1922 | Christensen | 52—507 |
| 1,554,858 | 9/1925 | Kopp | 52—656 |
| 1,960,015 | 5/1934 | Kitzelman | 49—56 |
| 2,613,402 | 10/1952 | Gouge | 52—507 |
| 1,090,211 | 3/1914 | Hiatt. | |

FRANK L. ABBOTT, Primary Examiner

J. L. RIDGILL, Jr., Assistant Examiner

U.S. Cl. X.R.

52—664; 210—164